United States Patent [19]

Spiess

[11] Patent Number: 4,460,190

[45] Date of Patent: Jul. 17, 1984

[54] HAND PROPELLED WHEELCHAIR

[76] Inventor: Erick M. Spiess, 5416 Mayflower La., Las Vegas, Nev. 89107

[21] Appl. No.: 394,651

[22] Filed: Jul. 2, 1982

[51] Int. Cl.[3] .............................................. B62M 1/14

[52] U.S. Cl. ..................................... 280/247; 280/269

[58] Field of Search ............... 280/244, 242 WC, 267, 280/269, 282, 247, 256

[56] References Cited

U.S. PATENT DOCUMENTS

| | | | |
|---|---|---|---|
| 1,105,216 | 7/1914 | Smith | 280/247 X |
| 2,643,898 | 6/1953 | Everest et al. | 280/247 X |
| 3,666,292 | 5/1972 | Bartos | 280/247 X |

*Primary Examiner*—John A. Pekar
*Attorney, Agent, or Firm*—Jack C. Munro

[57] ABSTRACT

A three wheeled wheelchair wherein two of the wheels are leading wheels with the single wheel being a trailing wheel. The wheelchair is propelled through the use of a chain drive assembly which is to be manually operated through the use of a handle assembly. Adjacent the handle assembly is a seat which is to support the occupant of the wheelchair. The seat is cushionly supported by a shock absorber assembly. The handle assembly is attached to a steering mechanism which, through lateral movement of the handle assembly, causes the leading wheels to be turned in respect to the frame of the wheelchair. A separate turning wheel assembly is to be manually movable to an extended position to cause the trailing wheel to be spaced from the supportive surface thereby permitting three hundred and sixty degree turning of the wheelchair about a single point.

9 Claims, 15 Drawing Figures

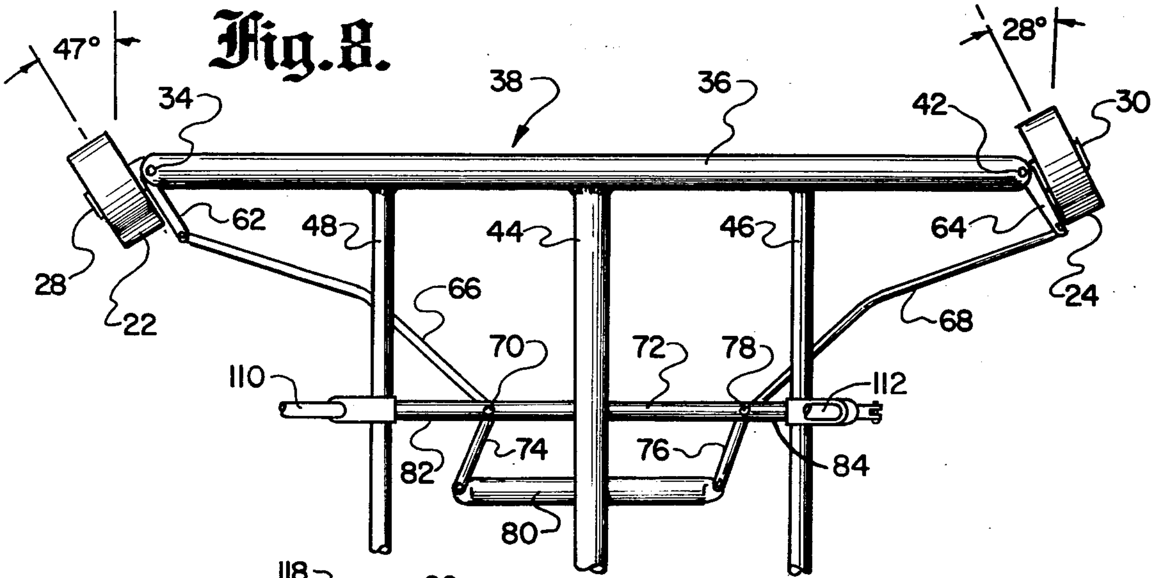
Fig. 8.
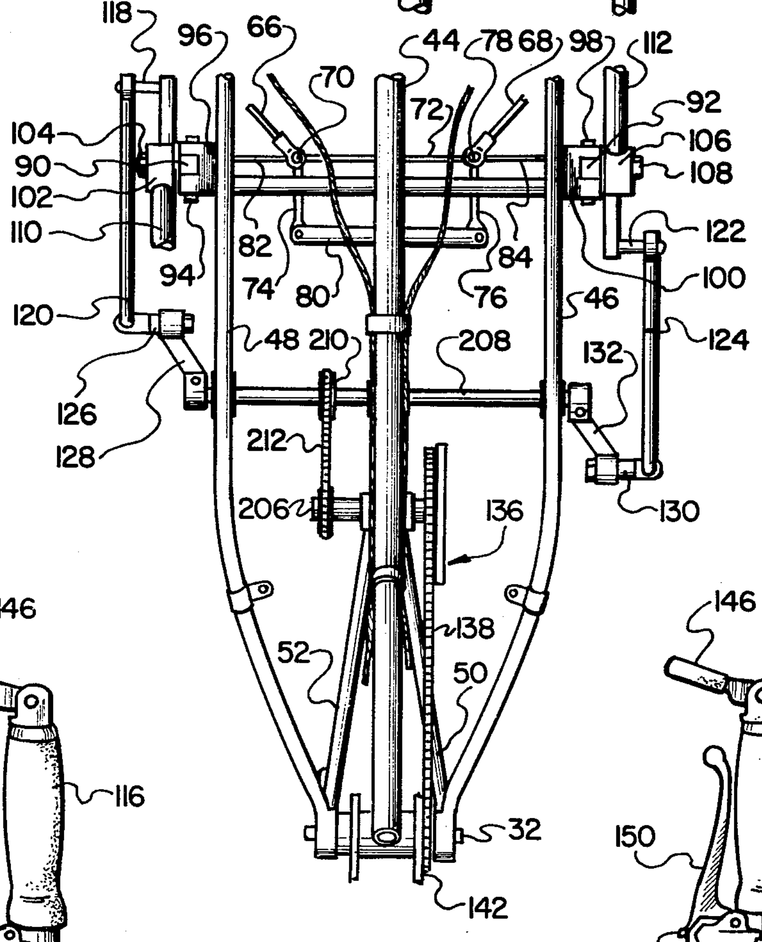
Fig. 10.
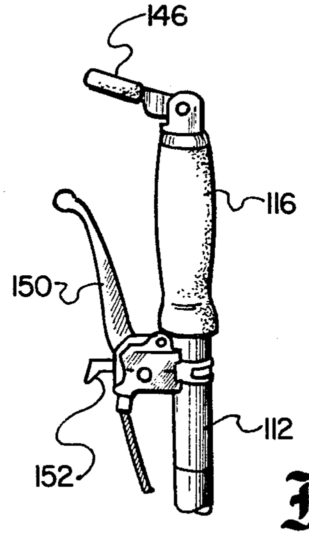
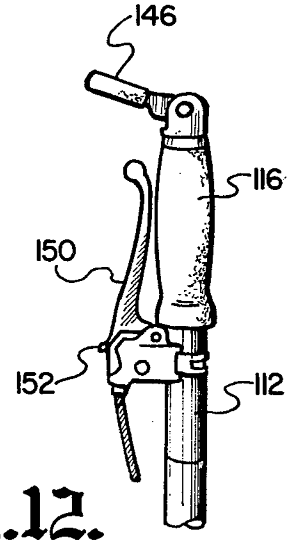
Fig. 11. Fig. 12.

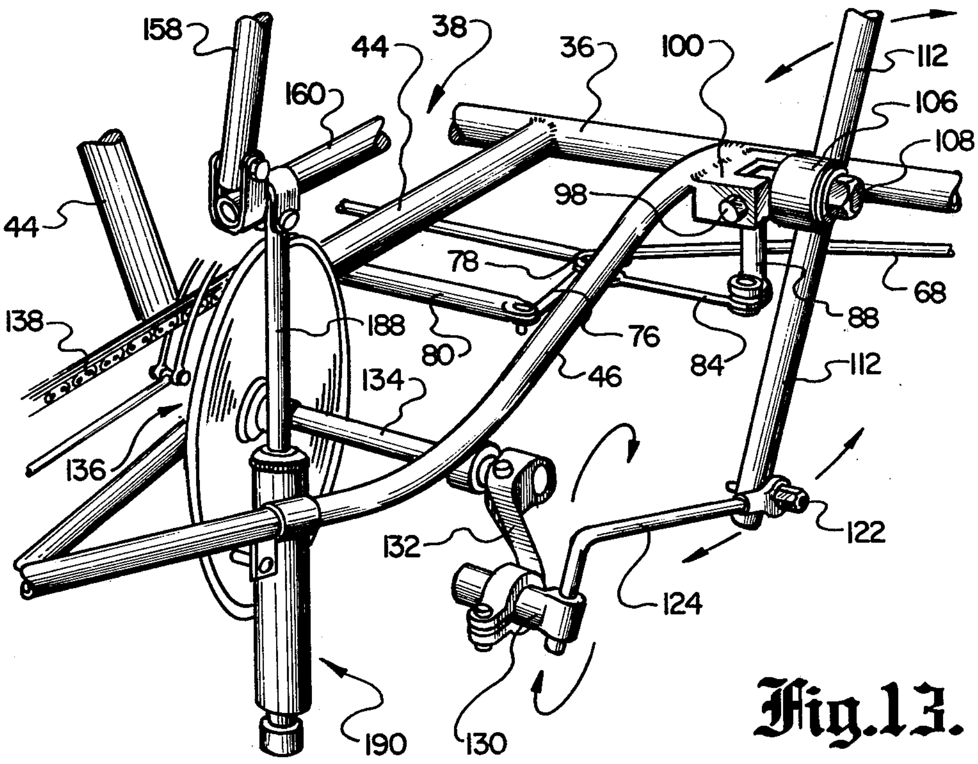
Fig.13.
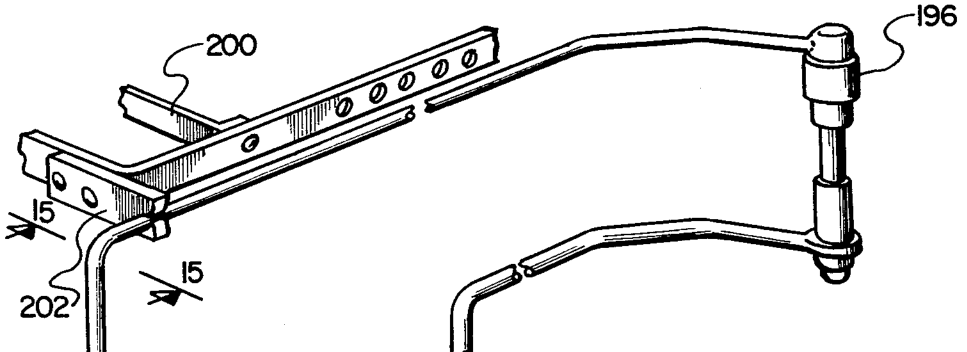
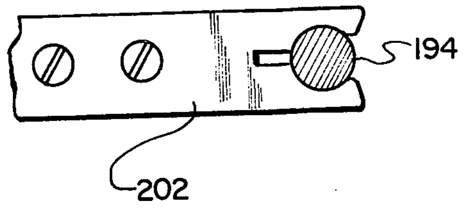
Fig.15.
Fig.14.

HAND PROPELLED WHEELCHAIR

BACKGROUND OF THE INVENTION

The use of wheelchairs for individuals that are not capable of navigating on their own legs has long been known. The conventional wheelchair is designed primarily for use indoors within a house or building. The normal method of propulsion of a wheelchair is by the user manually rotating each of the wheels by grabbing the rim of each wheel and turning each wheel.

An individual who is confined to a wheelchair is in the wheelchair when indoors and when outdoors is in a car or other type of vehicle. Since a conventional type of wheelchair is not designed for extensive travel outside of the home, it is not possible for the individual to navigate out of doors immediately around the individuals home or office. In other words, if the individual wants to go to the corner grocery store, that individual must use an automobile.

There is a need for a wheelchair which is designed primarily for outdoor usage which can be propelled manually with a minimum amount of effort thereby facilitating usage for excursions of up to a mile or more.

SUMMARY OF THE INVENTION

The wheelchair of the present invention utilizes three supporting wheels, two leading wheels and a single trailing wheel. Each wheel is rotatably mounted upon a frame. A seat for supporting the user is attached to the frame. The two leading wheels are connected together through a linkage assembly to be turnable to assume various inclined angles in respect to the frame so as to facilitate turning of the wheelchair. The steering linkage assembly for the leading wheel is such that the wheel nearest the turning direction assumes a greater inclined angle than the other leading wheel. This means that the inside wheel will always turn sharper than the outside leading wheel during the making of a turn. This keeps the wheel from dragging when making a turn which can put undue stress upon the dragged wheel. A pair of handles are connected directly adjacent the seat which when moved longitudinally operate through a chain drive assembly to rotate the trailing wheel thereby moving the wheelchair in a given direction. The handles also connect to the steering linkage assembly and when the handles are moved laterally, the leading wheels are turned. The wheelchair also includes a separate manually operable turning wheel, which when moved to the operative position, then locates the trailing wheel spaced from the ground. Manually turning of each of the leading wheels, one clockwise and one counterclockwise, can then result in the wheelchair turning three hundred and sixty degrees without any lineal movement. The braking system is included within the leading wheels and is operable by means of a brake lever assembly attached to the handles.

The at-rest position for the brake lever assembly places the brakes in the braking position. The levers are to be moved to the non-braking position and releasably locked in that position. There may be included a luggage carrier which can be readily moved from a carried position to an access position located directly adjacent the seat.

BRIEF DESCRIPTION OF THE DRAWINGS

FIG. 8 is a view similar to FIG. 6 but showing the linkage assembly in a position for the wheelchair to make a left turn;

FIG. 10 is a partial top plan view of the propulsion system utilized in conjunction with the wheelchair of this invention with certain unnecessary structure for the propulsion system having been eliminated for reasons of clarity;

FIG. 11 is a side elevational view of one of the graspable handles utilized in conjunction with the wheelchair of this invention showing the braking mechanism in an operating position;

FIG. 12 is a view similar to FIG. 11 but showing the braking mechanism in the braking position;

FIG. 13 is an illustrative isometric view to more clearly show the propulsion mechanism utilized in conjunction with the wheelchair of this invention wherein certain other portions of the wheelchair structure have been eliminated for reasons of clarity;

FIG. 14 is an isometric view of the article supporting rack which is utilized in conjunction with the wheelchair of this invention;

FIG. 15 is a view, partly in cross-section, taken along line 15—15 of FIG. 14.

DETAILED DESCRIPTION OF THE SHOWN EMBODIMENT

Figure 1:
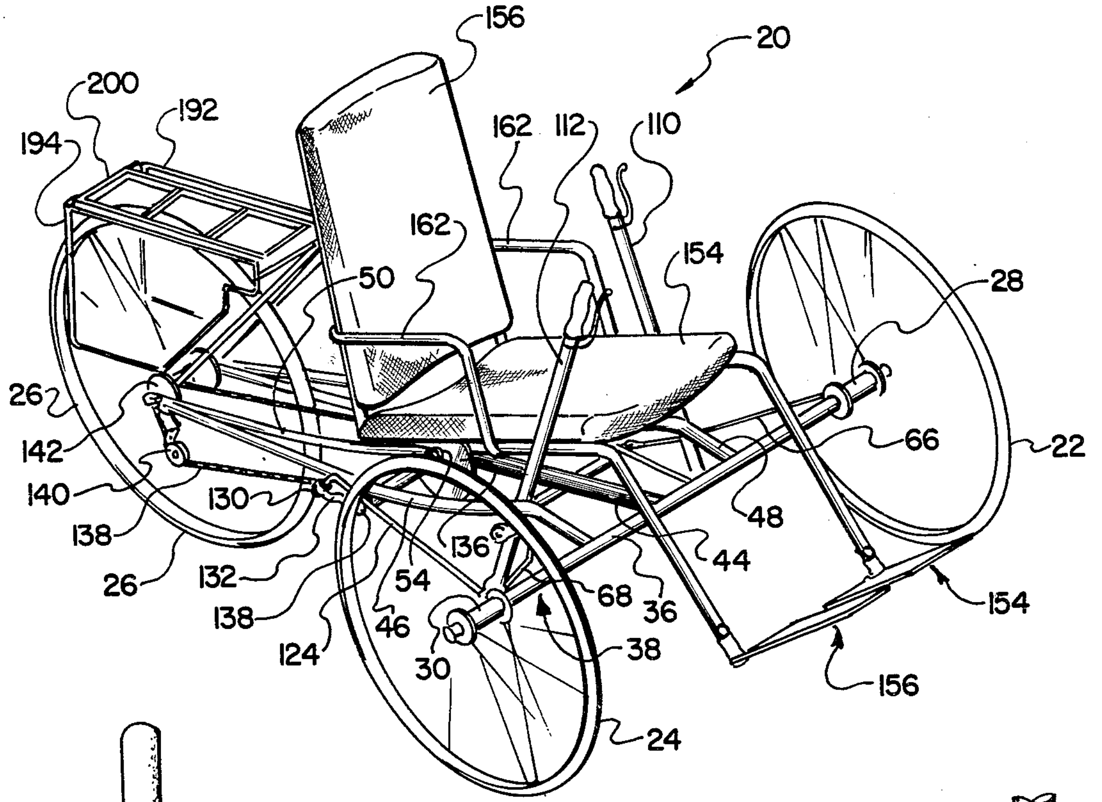
FIG. 1 is an isometric view of the wheelchair 20 of this invention.
Figure 4:
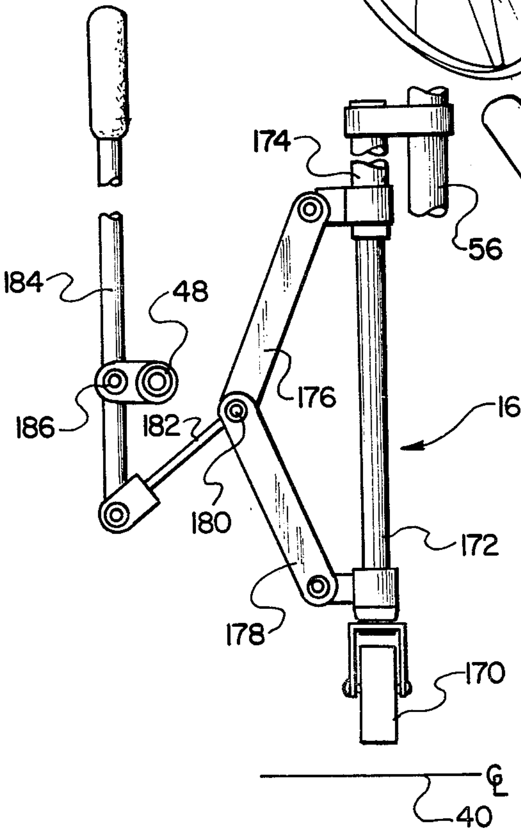
FIG. 4 is a side elevational view of the turning wheel assembly utilized in conjunction with the wheelchair of this invention showing the turning wheel assembly in the retracted position.

Referring particularly to the drawings, there is shown the wheelchair 20 of this invention. The wheelchair 20 includes a pair of spaced-apart, leading wheels 22 and 24 and a single trailing wheel 26. It is to be noted that the trailing wheel 26 is located on a plane centrally disposed between the leading wheels 22 and 24. It is further to be understood that the normal direction of movement of the wheelchair 20 of this invention will be with the leading wheels 22 and 24 leading and the trailing wheel 26 following. It is further to be understood that each of the wheels 22, 24 and 26 are basically identical in size and in construction and each include a centrally located conventional hub assembly. Appropriate bearings will be included within the hub.

The wheel 22 is rotatably mounted on a stubshaft 28. Similarly, the wheel 24 is mounted on a stubshaft 30. The trailing wheel 26 is mounted on a shaft 32. The shaft 28 is hingedly mounted by means of a pin 34 to a forward support member 36 of a frame 38. Similarly, the stubshaft 30 is pivotally mounted by means of a pin 42 to the opposite end of the forward support member 36. Therefore, the stubshafts 28 and 30 are capable of being pivoted in plane substantially parallel to the supportive surface 40 upon which the wheelchair 20 rests. Normally the supportive surface 40 will comprise a street or some other type of pavement.

The frame 38 also includes a longitudinal center support rod 44 which is welded at the midpoint of the longitudinal length of the forward support member 36.

The longitudinal center axis of the rod 44 is substantially perpendicular to the longitudinal center axis of the forward support member 36.

The frame 38 also includes side support rods 46 and 48 which are welded to the forward support rod 36. The back end of the rods 46 and 48 are deformed toward each other forming a small space therebetween. Within the small space between the rods 46 and 48, the trailing wheel 26 is rotatably mounted.

A brace 50 is fixedly secured to the side support rod 46 directly adjacent its rear end thereof. A similar brace 52 if fixedly secured to the side support rod 48 also adjacent its rear end thereof. The braces 50 and 52 are integrally attached at their free ends thereof to a shaft housing 54. The shaft housing 54 is also integrally secured to an upright post 56. Fixedly secured to the upper end of the upright post 56 are a pair of vertical braces 58 and 60. The lower end of the brace 58 is integrally attached to the side support rod 46, while the lower end of the brace 60 is integrally attached to the side support rod 48. The foregoing described members 36, 44, 46, 48, 50, 52, 56, 58 and 60 in total comprise the frame 38.

Fixedly connected to the inner end of the stubshaft 28 about the hinge pin 34 at substantially a right angle, is a short link 62. A similar short link 64 is similarly connected to the stubshaft 30. Pivotally connected to the free end of the link 62 is a long link 66. A similar long link 68 is pivotally connected to the free end of the short link 64. It is to be noted that the links 66 and 68 are not straight, but each include a slight bend. The purpose of this bend is strictly for eliminating interference with other structure associated with the wheelchair 20. The link 66 and 68 could be straight.

The free end of the long length 66 is pivotally connected through a hinge joint 70 to an actuating rod 72. Also hingedly connected to the hinge joint 70 is a connecting link 74. A similar connecting link 76 is hingedly connected to a hinge joint 78. Each of the connecting links 74 and 76 are hingedly connected to a fixed link 80. The fixed link 80 is fixedly secured to the rod 44, as by welding.

Also hingedly connected to the hinge joint 70 is a steering link 82. A similar steering link 84 is hingedly connected to the hinge joint 78. The free end of steering link 82 is pivotally connected to link extension 86. Similarly, the free end of the steering link 84 is pivotally connected to a link extension 88. The link extension 86 is fixedly secured to a sleeve 90.

Similarly, a link extension 88 is fixedly secured to a sleeve 92. The sleeve 90 is pivotally mounted by means of a bolt 94 to a bifurcated bracket 96. Again, in a similar manner, the sleeve 92 is pivotally mounted by means of bolt 98 to a bifurcated bracket 100. The bracket 96 is fixedly mounted onto side supporting rod 48, while the bracket 100 is fixedly mounted on the side supporting rod 46.

A bearing assembly 102 is fixedly mounted onto the sleeve 90. The bearing assembly 102 has an opening through which is mounted a bolt 104. A similar bearing assembly 106 is fixedly mounted onto the sleeve 92 and includes a central opening therethrough through which extends a bolt 108. An elongated handle 110 is connected with the bolt 104. Similarly, an elongated handle 112 is connected with the bolt 108. The handle 110 has a graspable grip 114 at its upper end and the handle 112 has a graspable grip 116 at its upper end.

To effect steering of the wheelchair 20 of this invention, the procedure is as follows: It is to be noted that the handle 110 is pivotable about the bolt 104. This pivoting movement is for population of the wheelchair and does not have anything to do with the steering. The same is true of the handle 112 which pivots about the bolt 108. However, either right or left lateral movement of the handles 110 and 112 results in pivoting of the sleeves 90 and 92 in respect to their respective brackets 96 and 100. It is to be noted that the lateral movement of the handles 110 and 112 is synchronized so that the handles 110 and 112 will always remain in respectively parallel longitudinally vertical planes. Rightward lateral in movement of the handles 110 and 112, which is shown in FIG. 7 of the drawings, results in leftward movement of the steering links 82 and 84. This, in turn, causes the long link 68 to move to the left as does the long link 66. This results in the links 62 and 64 being moved to an inclined position away from the zero degree position shown in FIG. 6 of the drawings. As a result, the wheels 22 and 24 are also located at the inclined position. Because of the assembled linkage arrangement, the angle of inclination of each of the wheels 22 and 24 will be different. A particular ratio is obtained. An example of this ratio is that if the wheel 24 is inclined at forty seven degrees, the wheel 22 will be inclined at twenty eight degrees. This ratio will be maintained throughout the range of values of the amount of inclination. This difference of inclination is desirable since the wheel nearest the turn should be at a greater angle to avoid sliding movement of the wheels 22 and 24.

If the handles 110 and 112 are moved leftwardly, as is shown in FIG. 8 of the drawings, the reverse is true, which results in wheel 24 being inclined less than the wheel 22. Again, this ratio will be the same so that if the wheel 24 is inclined at twenty eight degrees, the wheel 22 will then be inclined at forty seven degrees.

Figure 6:
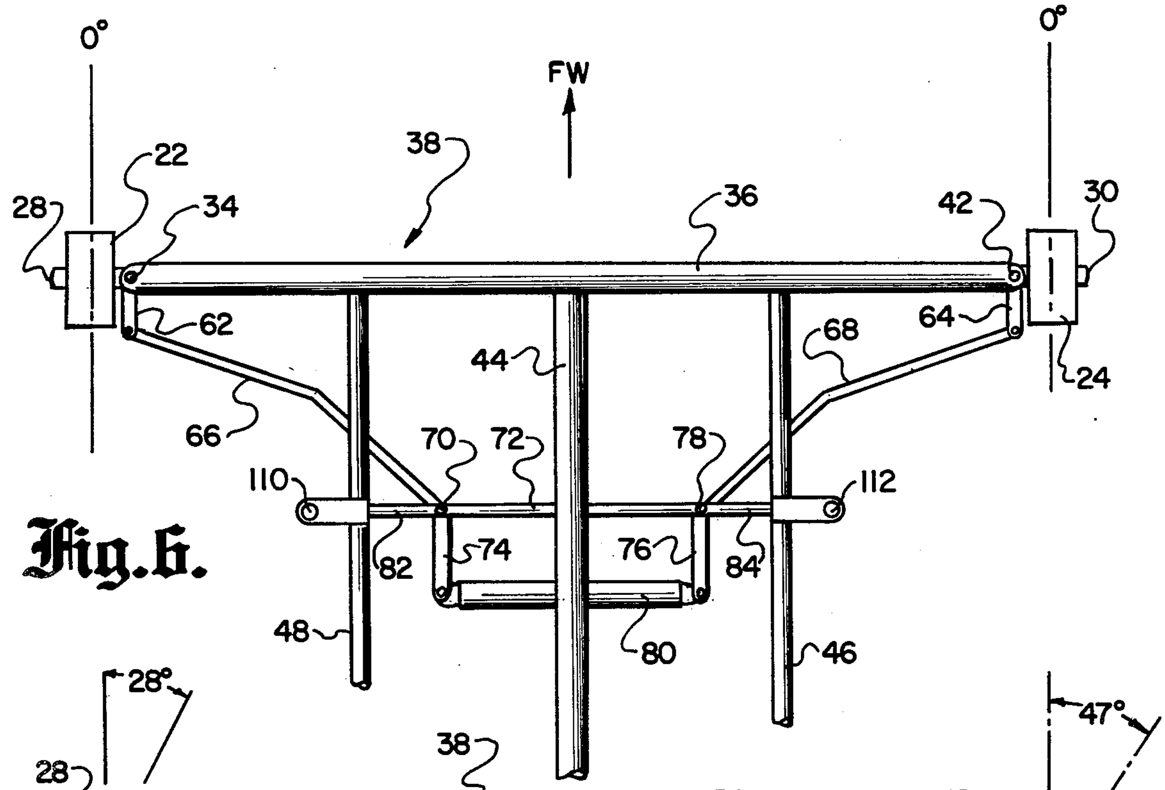
FIG. 6 is a diagramatic view depicting the steering linkage assembly utilized in conjunction with the wheelchair of this invention showing the leading wheels in the straight ahead or zero position.
Figure 7:
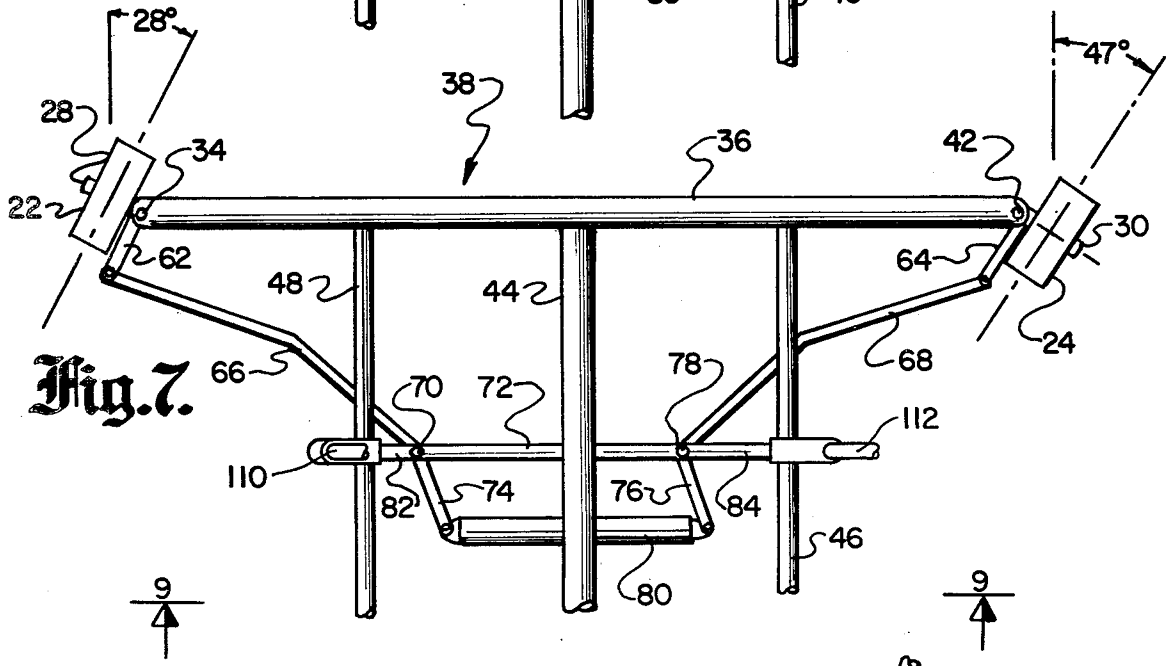
FIG. 7 is a view similar to FIG. 6 showing the linkage assembly in the position with the wheelchair to make a right turn.
Figure 9:
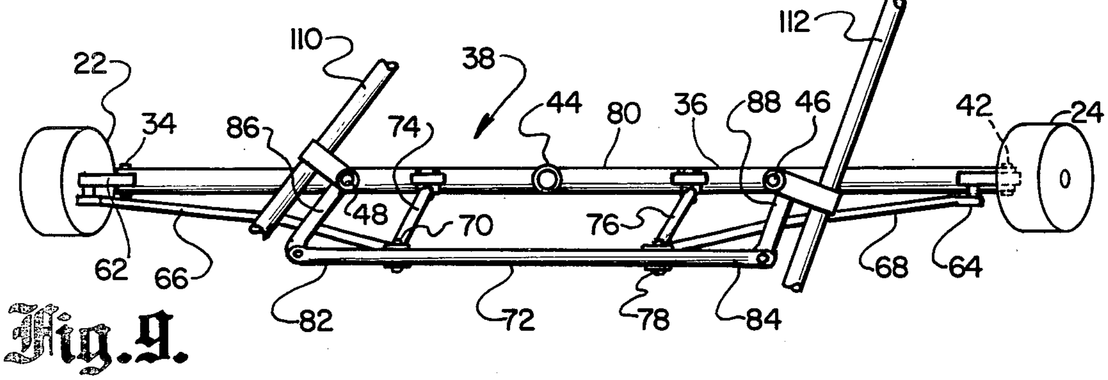
FIG. 9 is a view taken along line 9—9 of FIG. 8.

It is to be noted that when the handles 110 and 112 are in perfect vertical planes with respect to the supportive surface 40, each of the wheels 22 and 24 will be at the zero degree, or straight ahead position, as is shown in FIG. 6.

Propulsion of the wheelchair 20 will now be described: The wheelchair occupant is to also utilize the handles 110 and 112 in order to propell the wheelchair on the supportive surface 40. This is accomplished by reciprocal longitudinal pivoting movement of each of the handles 110 and 112 about a pivot axis established by bolts 104 and 108. The lower end of the handle 110 is connected through a pin 118 to a thrust link 120. Similarly, the lower end of the handle 112 is connected through a pin 122 to a thrust link 124. The thrust link 120 is connected through a pin 126 to a crank arm 128. Similarly, a thrust link 124 is connected through a pin 130 to a crank arm 132. Crank arm 128 is fixedly connected to one end of a crank shaft 134, while the crank arm 132 is fixedly connected to the opposite end of the crank shaft 134. The crank shaft 134 is rotatably mounted by appropriate bearing assemblies to extend between the side support rods 46 and 48. A conventional multiple speed sprocket assembly 136 is fixedly mounted onto the crank shaft 134 in between the side support rods 46 and 48. The sprocket assembly 136 connects with a chain 138. The chain 138 connects throuh a deraileur assembly 140 to a driven sprocket 142. The driven sprocket 142 is fixedly mounted onto the hub of the trailing wheel 126.

The use of the deraileur mechanism 40 and the sprocket assembly 136 is deemed to be conventional equipment and is what is utilized on "ten speed" bicycles. The different speed ratios are to be manually preset through the use of levers 144 and 146, which are mounted respectively at the upper end of the elongated handles 110 and 112. This changing of the gear ratios is deemed to be conventional and forms no specific part of this invention.

It is also to be noted that each of the elongated handles 110 and 112 include braking levers 148 and 150, respectively. Squeezing of the braking levers 148 and 150 will cause braking to occur within brake mechanisms mounted within the hubs of the leading wheels 22 and 24. Again, the use of the braking mechanism is, in and of itself not deemed to amount to invention and are deemed to be conventional. However, each of the braking levers 148 and 150 are capable of being locked in the braking position. This locking is shown by pivotal pawl 152 which is to be used in association with the braking lever 150. It is to be understood that similar pivotal pawl will be utilized in conjunction with the braking lever 148. Reference is to be had to FIG. 11 which shows the pawl 152 in the non-locking position and the braking lever 150 in the non-braking position. Reference is to be had to FIG. 12 which shows the locking pawl in the locking position and the braking lever 150 being held in the braking position. It is to be further understood that the braking levers 148 and 150 are physically secured by appropriate clamping means to the respective handles 110 and 112.

The user of the wheelchair 20 of this invention is to sit within a conventional seat structure 154 to which is connected a seat back 156. The seat 156 is to be fixedly mounted onto a pair of spaced-apart seat support members 160. The seat support members 160 are, in turn, connected to a pair of upstanding back support members 158. A pair of arm braces 162 connect together the members 158 and 160 to form a rigid unit. The back 156 is held in the upright position by means of the back support members 158.

The seat 154 is supported by a pair of actuators 190 although there is only one shown in the drawings. The housing section of each of the actuators 90 are to be mounted on appropriate portions of the frame 38, such as one being mounted on the side support rod 46 and the other being mounted on the side support rod 48. The piston rod 188 of each of the actuators 190 is fixedly mounted on a support member 160. This means that the individual seated in the wheelchair 20 is resiliently supported to absorb small amounts of shock by means of the actuator 190. The actuators 190 could be hydraulic or pneumatic or could include a spring mechanism. The back 156 can be disconnected from the actuators 190 and pivoted to a forwardly extending position. This pivoting occurs at the outer free end of the support members 160 which are pivotally connected to the forward support member 36. The primary reason for the pivoting of the seat 154 and 156 is so as to facilitate access to the chain drive assembly for reasons of maintenance.

Fixedly secured to the support members 160 and extending forwardly thereof are a pair of footrest assemblies 164 and 166. The footrest assemblies 154 and 156 are what are conventionaly utilized in conjunction with conventional wheelchairs and therefore form no specific part of this invention. However, the footrest assemblies 154 and 156 each include a resting platform which is to be movable between a movable position and a retracted position to facilitate entry into by the occupant and removal of the occupant from the wheelchair 20.

At times it is necessary that the wheelchair make turns in tight quartered situations. In order to achieve this, there is a separate turning wheel assembly 168 which includes a caster type wheel 170. The caster wheel 170 is mounted on a rod 172 which is telescopingly mounted within a sleeve 174. The sleeve 174 is fixedly mounted onto the upright post 56 of the frame 38. A first link 176 is pivotally connected to a bracket which in turn is mounted on the sleeve 174. A second link 178 which is of the identical length as of the first link 176, is pivotally mounted through a bracket assembly to the rod 172. The links 176 and 178 are connected together through a pin 180.

A rod 182 connects to the pin 180. The outer end of the rod 182 connects to the lower end of a lever 184. Lever 184 is pivotally mounted by pivot pin 186 to a bracket which in turn is fixedly mounted onto side support rod 48.

Figure 5:
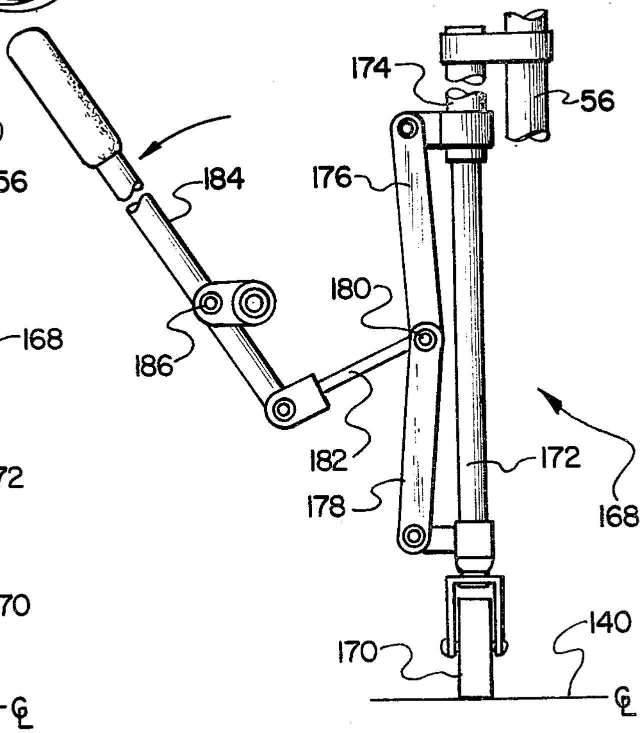
FIG. 5 is a view similar to FIG. 4, but showing the turning wheel assembly in the extended position.
Figure 2:
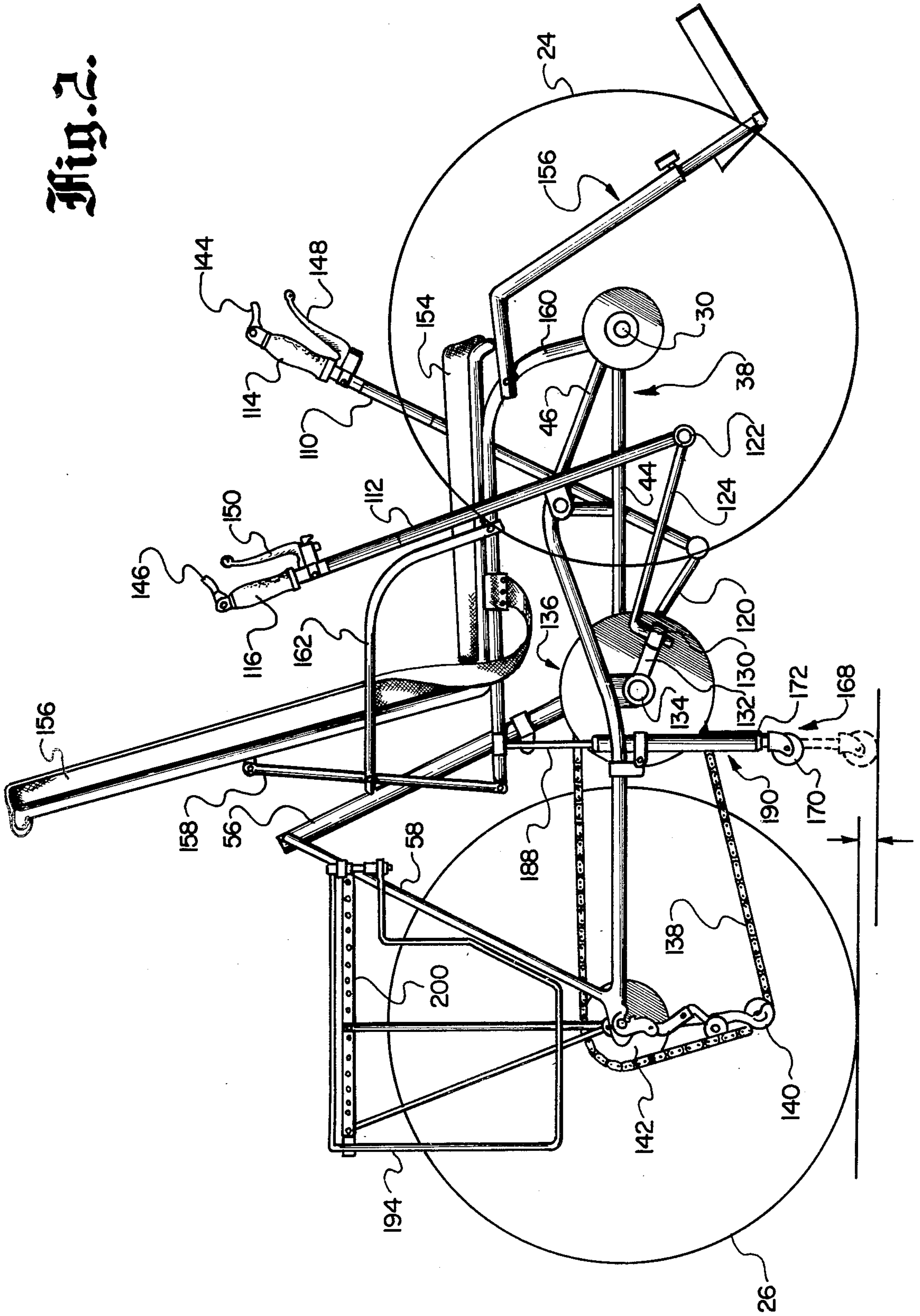
FIG. 2 is a right side elevational view of the wheelchair of this invention.
Figure 3:
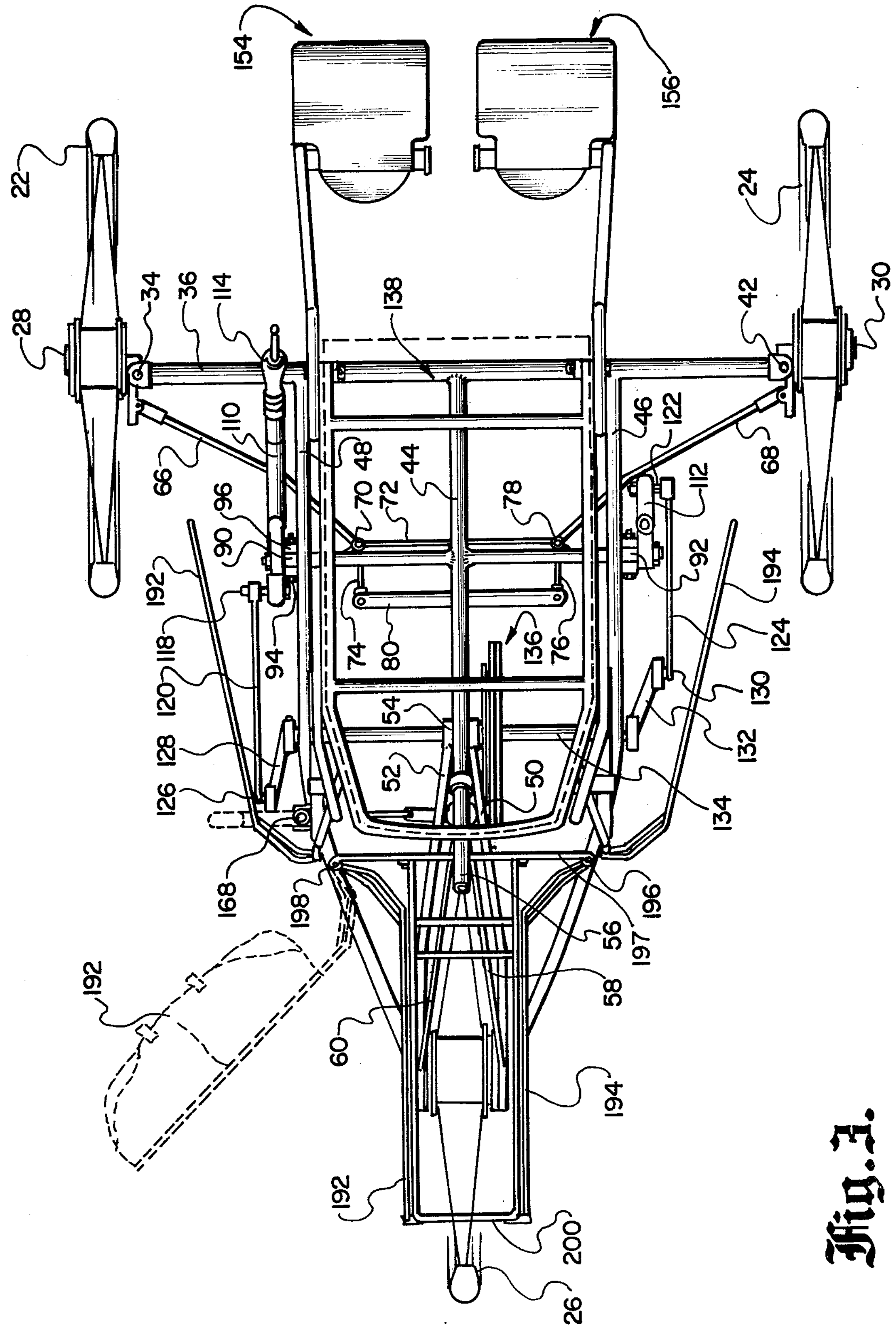
FIG. 3 is a top plan view of the wheelchair of this invention with the seat assembly having been removed for purposes of illustration.

The turning wheel assembly 168 is capable of being moved from a retracted position (defined by the caster wheel 170 being spaced from the supportive surface 140) to an operative position (the caster wheel 170 in contact with the supportive surface 40) which has also caused the trailing wheel 26 to be displaced off the supportive surface 40. This movement is created by manually moving lever 184 to straighten the links 176 and 178 to assume a slightly overcenter position as shown in FIG. 5 of the drawings. This causes the rod 172 to extend from the sleeve 174 a sufficient distance until the wheel 170 contacts the supportive surface 40 and effects raising of the trailing wheel 26 a slight distance. At this particular time, the only wheels that are in contact with the supportive surface 40 are the leading wheels 22 and 24 and the turning wheel 170. The wheelchair 20 can then turn 360 degrees while remaining in place.

To facilitate the carrying articles, such as books, papers, groceries and the like, there is provided a pair of wire frames 192 and 194. The frame 194 is pivotally mounted by a pivot bracket assembly 196 to cross member 197. In a similar manner, the wire frame 192 is also pivotally mounted by a pivot bracket assembly 198 to cross member 197. Cross member 197 is fixedly supported onto braces 58 and 60. This mounting of the wire frames 192 and 194 is such that the occupant of the wheelchair 20 can reach around and grasp either frame 192 and 194 and pivot such directly alongside of the wheelchair 20. This is so as to facilitate entry into a knapsack or other similar type of container which has been supported on the frames 192 and 194.

Located between the frames 192 and 194 when in the stowed position, there is a center frame 200. Attached to the rearwardmost edge of the center frame 200 are a pair of clamping members 202 with only one being shown in the drawings. One of the clamping members 202 is to engage with wire frame member 192 when in the retracted position to hold such in place, while the other clamping member 202 is engaged with wire frame member 194 to similarly hold such in place when in the retracted position. The center frame 200 is supported by means of a plurality of braces which also extend from appropriate members of the frame 38 located directly adjacent the hub portion of the trailing wheel 26.

Referring particularly to FIG. 10 of the drawings, there is shown a modified form of chain device assembly wherein like numbers have been utilized to refer to like parts. The before described chain drive assembly defines the crank shaft 134 as being conducted directly through the center of the sprocket assembly 136. However, the sprocket assembly 136 could be rotatably supported by means of a stub shaft 206 on rod 44. The crank shaft 208 is to be mounted parallel to the stub shaft 206, but spaced forwardly thereof. The crank shaft 208 is supported in the same manner from the side support members 46 and 48. A driving sprocket 210 is attached to the crank shaft 208 and is connected with an intermediate chain 212. The intermediate chain 212 is then to connect with an appropriate sprocket included within the sprocket assembly 136 which is fixedly mounted onto the stub shaft 206.

It is to be understood from the foregoing that the propulsion of the wheelchair 20 is by the operator manually pushing and pulling the elongated handles 110 and 112 in a forward and reverse manner. The handle 110 is 180 degrees out of phase from the handle 112. This means that with respect to the rotational axis of the crank shaft 134, that the crank arm 132 is 180 degrees displaced from the crank arm 128. Therefore, when the operator is pulling on handle 112, he is simultaneously pushing on handle 110 to achieve the propulsion. Also, when the operator is pushing on handle 112, he is pulling on handle 110.

What is claimed is:

1. A wheelchair comprising:

a frame;

a pair of spaced apart leading wheels rotatably mounted on said frame;

a single trailing wheel rotatably mounted on said frame;

a seat mounted by mounting means on said frame, said seat being located forward of said trailing wheel and between said leading wheels;

a chain drive assembly mounted on said frame and connected to said trailing wheel, said chain drive assembly for affecting rotation of said trailing wheel and movement of said wheelchair in respect to a supportive surface; and torque applying means mounted on said frame connected to said chain drive assembly, said torque applying means including a graspable handle assembly located directly adjacent said seat, longitudinal oscillatory movement of said graspable handle assembly operates through said chain drive assembly to rotate said trailing wheel, said torque applying means being connected to said leading wheels, lateral movement of said graspable handle assembly results in turning of said leading wheels for changing the direction of movement of said wheelchair.

2. The wheelchair as defined in claim 1 wherein:

during turning of said leading wheels the leading wheel closest in the direction of the turn is oriented at a greater angle than the other of said leading wheels.

3. The wheelchair as defined in claim 1 including:

shock absorbing means located between said frame and said seat.

4. The wheelchair as defined in claim 1 wherein:

said seat being hingedly mounted on said frame, whereby said seat is to be movable to a non-usable position so as to provide access to components of said wheelchair for maintenance requirements.

5. The wheelchair as defined in claim 1 wherein:

said graspable handle assembly comprising a pair of spaced apart handles, said seat being located between said handles.

6. The wheelchair as defined in claim 5 wherein:

each said handle including manually operable braking levers, each said braking lever being normally biased into a braking position, each said handle including locking means to hold each said braking lever in a non-braking position.

7. The wheelchair as defined in claim 1 wherein:

said chain drive assembly including a crankshaft, said crankshaft being directly operated by said torque applying means, said chain drive assembly including a chain ring assembly, said chain ring assembly being rotatably mounted by a spindle assembly which is mounted upon said frame, said crankshaft being spaced from said spindle assembly, a secondary chain being connected between said chain ring assembly and said crankshaft.

8. The wheelchair as defined in claim 1 including:

a manually operated turning wheel assembly attached to said frame, said turning wheel assembly being movable between a retracted position and an extended position, with said turning wheel assembly in said extended position said trailing wheel being spaced from the supportive surface.

9. The wheelchair as defined in claim 1 including:

a luggage rack assembly attached to said frame, said luggage rack assembly being movable between a first position and a second position, said first position being located directly adjacent said trailing wheel, said second position being located directly adjacent said seat.

* * * * *